United States Patent
Havlena

(10) Patent No.: US 9,760,067 B2
(45) Date of Patent: Sep. 12, 2017

(54) SYSTEM AND METHOD FOR PREDICTING FUTURE DISTURBANCES IN MODEL PREDICTIVE CONTROL APPLICATIONS

(75) Inventor: Vladimir Havlena, Prague (CZ)

(73) Assignee: Honeywell International Inc., Morris Plains, NJ (US)

( * ) Notice: Subject to any disclaimer, the term of this patent is extended or adjusted under 35 U.S.C. 154(b) by 1024 days.

(21) Appl. No.: 12/556,811

(22) Filed: Sep. 10, 2009

(65) Prior Publication Data

US 2011/0060424 A1    Mar. 10, 2011

(51) Int. Cl.
G05B 13/04   (2006.01)

(52) U.S. Cl.
CPC .................... G05B 13/048 (2013.01)

(58) Field of Classification Search
CPC .... G05B 13/048; G05B 13/042; G05B 13/04; G05B 17/02; G06F 17/5018; G06F 17/5009
USPC .......... 700/29–31; 703/7, 18, 20–21
See application file for complete search history.

(56) References Cited

U.S. PATENT DOCUMENTS

| | | | |
|---|---|---|---|
| 5,329,442 A * | 7/1994 | Moshfegh | 700/29 |
| 5,740,033 A * | 4/1998 | Wassick | G05B 13/048 700/29 |
| 6,253,113 B1 | 6/2001 | Lu | |
| 6,347,254 B1 * | 2/2002 | Lu | G05B 13/024 700/29 |
| 7,292,899 B2 * | 11/2007 | Dadebo et al. | 700/29 |
| 7,400,933 B2 * | 7/2008 | Rawlings et al. | 700/28 |
| 7,599,751 B2 * | 10/2009 | Cutler | 700/38 |
| 2004/0093124 A1 | 5/2004 | Havlena | |
| 2006/0137335 A1 * | 6/2006 | Stewart et al. | 60/370 |
| 2006/0173604 A1 * | 8/2006 | Yasui et al. | 701/103 |
| 2007/0067068 A1 | 3/2007 | Havlena et al. | |

(Continued)

FOREIGN PATENT DOCUMENTS

| WO | WO 03/107103 A1 | 12/2003 |
|---|---|---|
| WO | WO 2008/073259 A1 | 6/2008 |
| WO | WO 2009/086220 A1 | 7/2009 |

OTHER PUBLICATIONS

"Model predictive control", Wikipedia, the free encyclopedia http://en.wikipedia.org/wiki/Model_predictive_control.

(Continued)

*Primary Examiner* — Jason Lin
(74) *Attorney, Agent, or Firm* — Kevin Soules; Kermit D. Lopez; Luis M. Ortiz

(57) ABSTRACT

A system and method for predicting future disturbance in MPC applications by segregating a transient part and a steady state value associated with the disturbance. A dynamic state space model that includes a variable disturbance prediction module can be utilized for analyzing a dynamic behavior of a physical process associated with a process model. The process model represents a dynamic behavior of the physical process being controlled and the dynamic state space model represents current deviations from the process model and future deviations over a predetermined prediction horizon. A predicted trajectory can be calculated as a response to the initial conditions estimated by a Kalman Filter for the process model extended by a disturbance model. The output of the dynamic state space model utilized for the disturbance prediction can be further provided as an estimated input to a MPC.

20 Claims, 5 Drawing Sheets

(56) References Cited

U.S. PATENT DOCUMENTS

| | | | |
|---|---|---|---|
| 2007/0156259 A1* | 7/2007 | Baramov | G05B 13/048 700/44 |
| 2008/0065241 A1* | 3/2008 | Boe | G05B 13/042 700/44 |
| 2008/0140227 A1* | 6/2008 | Attarwala | 700/30 |
| 2008/0230637 A1* | 9/2008 | Havlena et al. | 241/25 |
| 2009/0056603 A1 | 3/2009 | Havlena et al. | |
| 2009/0198350 A1 | 8/2009 | Thiele | |
| 2009/0240480 A1* | 9/2009 | Baramov | G05B 13/048 703/6 |
| 2009/0319059 A1* | 12/2009 | Renfro et al. | 700/30 |
| 2010/0087933 A1* | 4/2010 | Cheng | 700/30 |
| 2010/0268353 A1* | 10/2010 | Crisalle et al. | 700/29 |
| 2010/0305719 A1* | 12/2010 | Pekar et al. | 700/29 |

OTHER PUBLICATIONS

Morrison, D., "Is it time to replace PID?" *Intech* Mar. 1, 2005.
Nikolaou, M., "Model Predictive Controllers: A Critical Synthesis of Theory and Industrial Needs," *Advances in Chemical Engineering Series* (2001) Academic Press, pp. 1-50.
Orukpe, P. E., "Basics of Model Predictive Control," Imperial College, London Apr. 15, 2005. http://www3.imperial.ac.uk/portal/pls/portallive/docs/1/50918.PDF.
Venkat, A. N. et al., "Distributed Output Feedback MPC for Power System Control," *Decision and Control, 2006 45th IEEE Conferece*, Dec. 13-15, San Diego, CA.
EP Search Report for EP Serial No. 10 17 3467 dated Sep. 29, 2011.

\* cited by examiner

SYSTEM AND METHOD FOR PREDICTING FUTURE DISTURBANCES IN MODEL PREDICTIVE CONTROL APPLICATIONS

TECHNICAL FIELD

Embodiments are generally related to process control systems and methods. Embodiments are also related to MPC (Model-based Predictive Control) processes. Embodiments are additionally related to disturbance modeling techniques for model predictive control applications.

BACKGROUND OF THE INVENTION

Process control systems can be utilized to control process facilities such as, for example, chemical, petroleum and other industrial operations. A typical process control system includes one or more process controllers communicatively coupled to each other, to at least one host or operator workstation, and to one or more field devices via analog, digital or combined analog/digital buses. Process facility management providers develop such process control systems to satisfy a wide range of process requirements and facility types. A primary objective of such providers is to control, in a centralized or decentralized system, as many processes as possible to improve the overall efficiency of the facility. Each process, or group of associated processes, possesses certain input (e.g., flow, feed, power, etc) and output (e.g., temperature, pressure, etc) characteristics.

A common approach to advanced industrial process control involves the use of MPC (Model-based Predictive Control) techniques. MPC is a control strategy that utilizes an optimizer to solve for a control trajectory over a future time horizon based on a dynamic model of the process. In the majority of prior art MPC approaches, the current measured disturbance remains constant over the entire prediction horizon because there is no process information in the future. Such a feature may be referred to as a constant additive disturbance assumption. In many, if not most, applications, this adversely affects the regulatory performance of a standard MPC controller. Also, for high-frequency/pulse disturbances, such an approach results in an oscillatory behavior of unforced predictions and significant control effort.

Based on the foregoing, it is believed that a need exists for an improved method and system for predicting future disturbances in an MPC application. Such an improved method and system is described in greater detail herein.

BRIEF SUMMARY

The following summary is provided to facilitate an understanding of some of the innovative features unique to the present invention and is not intended to be a full description. A full appreciation of the various aspects of the embodiments disclosed herein can be gained by taking the entire specification, claims, drawings, and abstract as a whole.

It is, therefore, one aspect of the present invention to provide for an improved model-based predictive controller, which is capable of predicting future disturbance trajectory It is another aspect of the present invention to provide for an improved disturbance modeling method and system for MPC applications.

The aforementioned aspects and other objectives and advantages can now be achieved as described herein. A system and method for predicting future disturbance in MPC applications by segregating a transient part and a steady state value associated with the disturbance is disclosed. A dynamic state space model that includes a variable disturbance prediction module can be utilized for analyzing the dynamic behavior of a physical process associated with a process model. The process model represents the dynamic behavior of the physical process being controlled and the dynamic state space model represents current deviations from the process model and future deviations over a predetermined prediction horizon. A predicted trajectory can be calculated as a response to the initial conditions estimated by a Kalman filter for the process model extended by a disturbance model. The output of the dynamic state space model utilized for the disturbance prediction can be provided as an estimated input to an MPC.

The MPC utilizes the process model and the disturbance model to achieve the desired behavior of the process model by determining process predictions and ultimately provides an optimized output to the process model with a controlled set of parameters. The MPC receives input signals indicative of measured process parameters and the disturbance prediction module perform independent process control decisions which determine manipulated parameter values in response to the input signals. The output from the MPC can be further utilized as a controlled input for the process model to obtain an optimized output. The unforced response can be significantly calmer than prior art techniques; therefore, the proposed approach can be effectively utilized in high frequencies and pulse disturbances. The MPC technique associated with the dynamic future disturbance prediction module is expected to gain widespread acceptance in various industrial process application due to its ability to achieve multi-variable control objectives in the presence of dead time, process constraints, and modeling uncertainties.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

Figure 1:
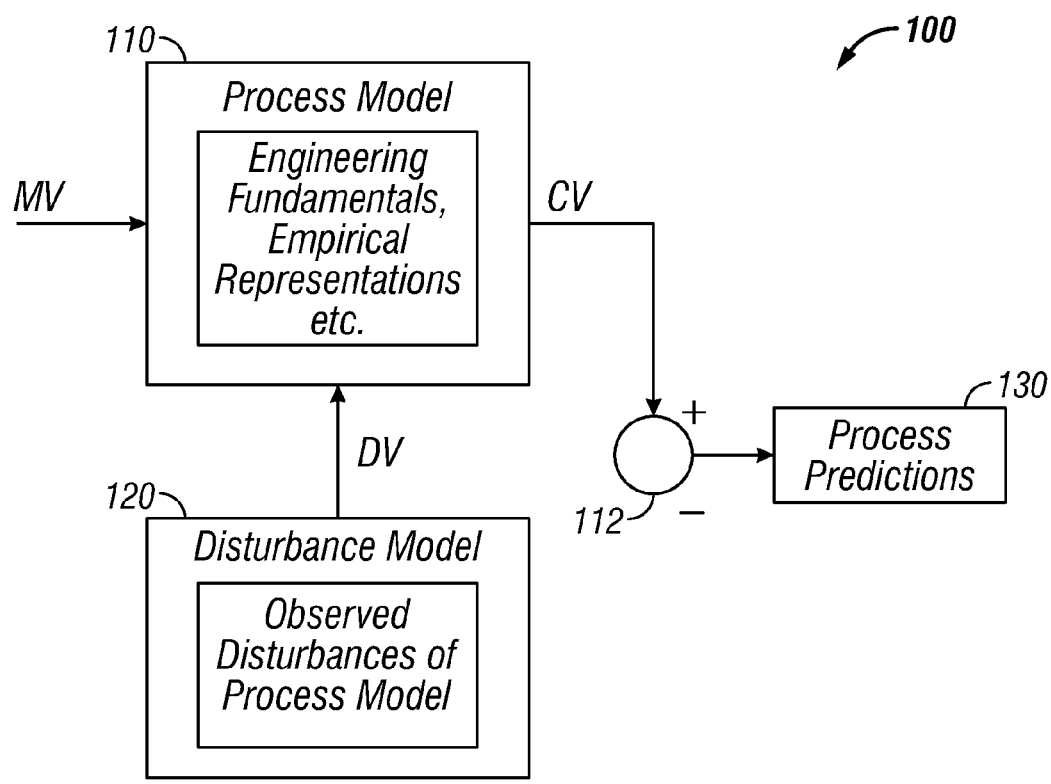
FIG. 1 illustrates a block diagram of a process model and a disturbance model employed in a MPC application to determine process predictions, in accordance with an embodiment.

FIG. 1 illustrates a block diagram 100 of a process model 110 and a disturbance model 120 employed in the context of an MPC Controller 250 (Model-based Predictive Controller) to determine process predictions 130, in accordance with an embodiment. Note that in FIGS. 1-4, identical or similar parts or elements are generally indicated by identical reference numerals. The process model 110 may model, for example, a manufacturing plant, a mineral refinery, or a crude oil refinery that possesses certain input (e.g., flow, feed, power, etc.) and particular output characteristics such as temperature, pressure, etc. The MPC Controller 250 can optimize such characteristics through feedback and actuation. The MPC Controller 250 generally evaluates the observed information and applies an appropriate control strategy to the process model 110 to achieve a desired behavior while rejecting disturbances acting on the process model 110. The MPC Controller 250 utilizes the process model 110 and the disturbance model 120 to achieve the desired behavior of the process model 110 by determining process predictions 130.

The process model 110 comprises data associated with the process such as engineering fundamentals, empirical representations, and the like ultimately transformed to a state-space model. The disturbance model 120 may constitute, for example, the dynamic response of observed disturbances ultimately transformed to a state-space model with respect to each disturbance input to the process. Data from the disturbance model 120 is input as DV (Disturbance Variables) to the process model 110. Note that the DV is just an additional input to the process and can enter the process model 110 at any point and is not limited to additive disturbances on process input.

MV (Manipulated Values or Variables) can be additionally input to the process model 110. The MPC Controller 250 integrates data from the process model 110 and the disturbance model 120 for determining manipulated value MV (process input) trajectory 130. The MV trajectory 130 can thus be utilized as a controlled input for the process model 110 to obtain an output prediction. The process model 110 represents a dynamic behavior of the physical process being controlled and the disturbance model 120 represents estimated disturbance based on current deviations of measured process output from the process model output 110 and future trajectory of the disturbance over a predetermined prediction horizon. Note that the process model and the disturbance model described herein are mathematical models for calculating the process and disturbance predictions.

Figure 2A:
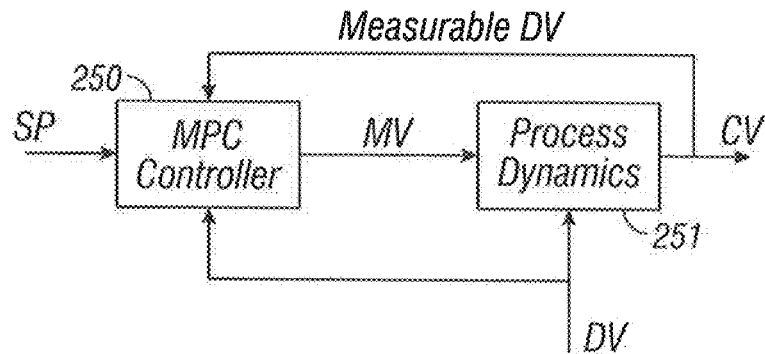
FIGS. 2A and 2B illustrate respective block diagrams of process control systems, in accordance with the disclosed embodiment.
Figure 2B:
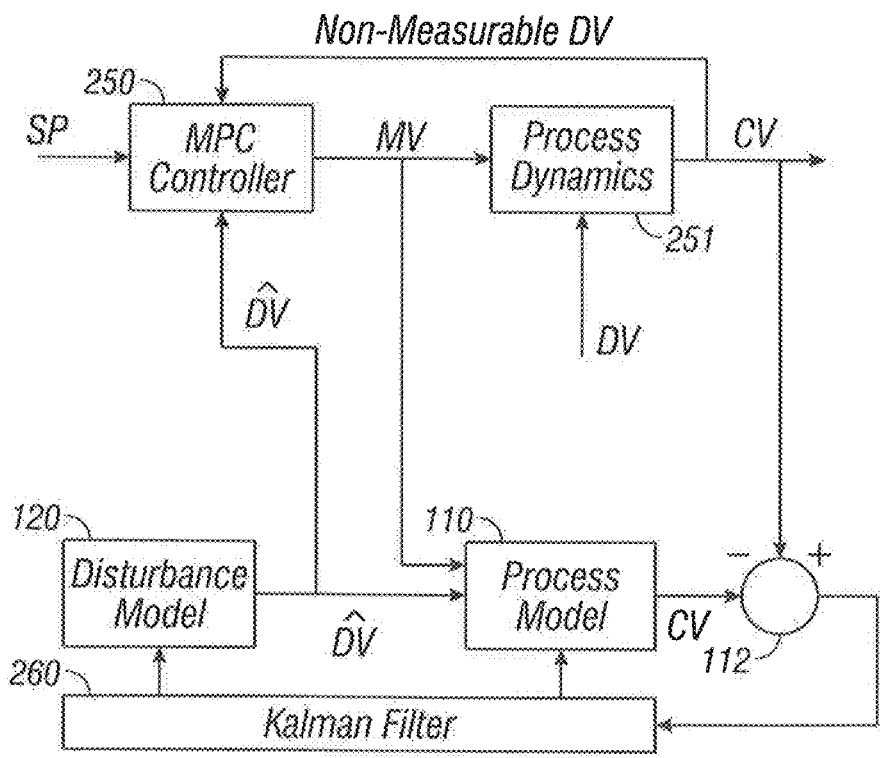

FIGS. 2A-2B illustrates respective block diagrams of a process control system 201 and a process control system 203, in accordance with the disclosed embodiments. Note that in FIGS. 2A-2B, identical or similar parts or elements are generally indicated by identical reference numerals. As indicated in FIG. 2A, the process control system 201 generally includes an MPC controller 250 whose output is fed as input to a process dynamics module 251. In the configuration depicted in FIG. 2A of system 201, a single MPC controller 250 is depicted. In the configuration of system 203 depicted in FIG. 2B, the MPC controller 250 communicates with the process dynamics module 251 and receives input from the disturbance model module 120, which in turn provides input to process model module 110. A Kalman filter 260 shown in FIG. 2B provides input data to the disturbance model 120 and the process model 110. The Kalman filter 260 generally constitutes a process for estimating the value of parameters in the presence of, for example, noise and time delays. Note that while the controller 250 can calculate the optimal input based on the estimated DVA^hat, the real process dynamics of module 251 can respond to the real (i.e., but unmeasurable) disturbance DV.

FIGS. 2A-2B generally illustrates the fact that while for measurable disturbances, the value of DV can be used for feed forward DV compensation (under the assumption that future DV values will be equal to its current value—FIG. 2A), but for unmeasurable DVs, the current value has to be estimated (estimated values are indicated with a hat ^). However, the use of estimated value provides another degree of freedom-based on the dynamic model of the DV used for the estimation of its current value and the current initial state of the "disturbance generator", also its future trajectory can be calculated and used as the FF in MPC algorithm (FIG. 2B).

The process control system 201 and/or 203 may be configured as part of a distributed or scalable control process utilized in, for example, chemical, petroleum, and other industrial processes such as manufacturing plants, mineral, or crude oil refineries, etc. Note that the disclosed approach, although discussed in the context of a single MPC controller 250, may be employed in much more complex processes wherein multiple MPC controllers are utilized. The process control system 201 and/or 203 can be adapted for controlling a process utilizing optimal multivariable controllers in particular model predictive control (MPC) techniques. The MPC Controller 250 can be programmed utilizing any number of optimization techniques such as, for example (but not limited to) standard Quadratic Programming (QP) and/or Linear Programming (LP) techniques to predict values for the control outputs. The MPC Controller 250 can be implemented in the form of online optimization and/or by using equivalent lookup tables computed with a hybrid multi-parametric algorithm depending on the complexity of the problem.

The MPC controller 250 shown in FIG. 2A may communicate with both the process model 110 and the independent disturbance model 120. The disturbance model 120 can be a dynamic state space model utilized for disturbance prediction. The process model 110 can be characterized by controlled variables (CV) or process output variables and disturbance variables DV. As indicated in FIG. 2B, the DV are input to the process model 110 along with manipulated variables (MV) output from the MPC controller 250. CV are output from the process model 110 and supplied as input to the summation device 112. Note that the MV constitutes process input variables to both the process model 110 and the process dynamics module 251. CV are also output from process dynamics module 251 and fed as input to the summation device 112. Such a system or process can be applied to any form of operation in which the effects of changes in the MV and DV generate some changes in the CV over a period of time.

A steady state represents final state of the process following the changes in the MV and/or the DV. For a stable process, the steady state is achieved when the rate of change of its output variables becomes zero for inherently stable process or the rate of change of its output attains a constant value. For open-loop unstable process, such as liquid accumulator, the steady state can be achieved when the rate of change of its output variables attain a constant value. The process model 110 characterized in FIGS. 2A and/or 2B can be a simple process involving one input variable and one output variable or a more complex process involving multiple input variables and multiple output variables.

A predicted DV trajectory may be calculated as a response to the initial conditions estimated by the Kalman Filter 260 for the process model 110 extended by the disturbance model 120. The Kalman Filter 260 may be provided in the context of an optimal filtering technique utilized for estimating the state variables of the process model 110. The Kalman Filter 260 can be a time domain operation that is suitable for use in estimating the state variables of linear time-varying systems that can be described by a set of, for example, discrete models. The Kalman Filter 260 can be generally utilized for state estimation in many process models 110 that may be approximately described as linear. The output of the disturbance model 120 utilized for the disturbance prediction can be further provided as an estimated input to the MPC controller 250.

The MPC Controller 250 can determine the behavior of the process model 110 for the obtained disturbances and ultimately provides an optimized output to the process model 110 with a controlled set of parameters. The MPC Controller 250 can utilize both linear and non-linear optimization to determine the manipulations of processes within the process model 110 that is required to achieve the desired set of controlled parameters. The output signals transmitted from the MPC controller 250 include one or more manipulated parameter values that govern the process model 110.

Figure 3:
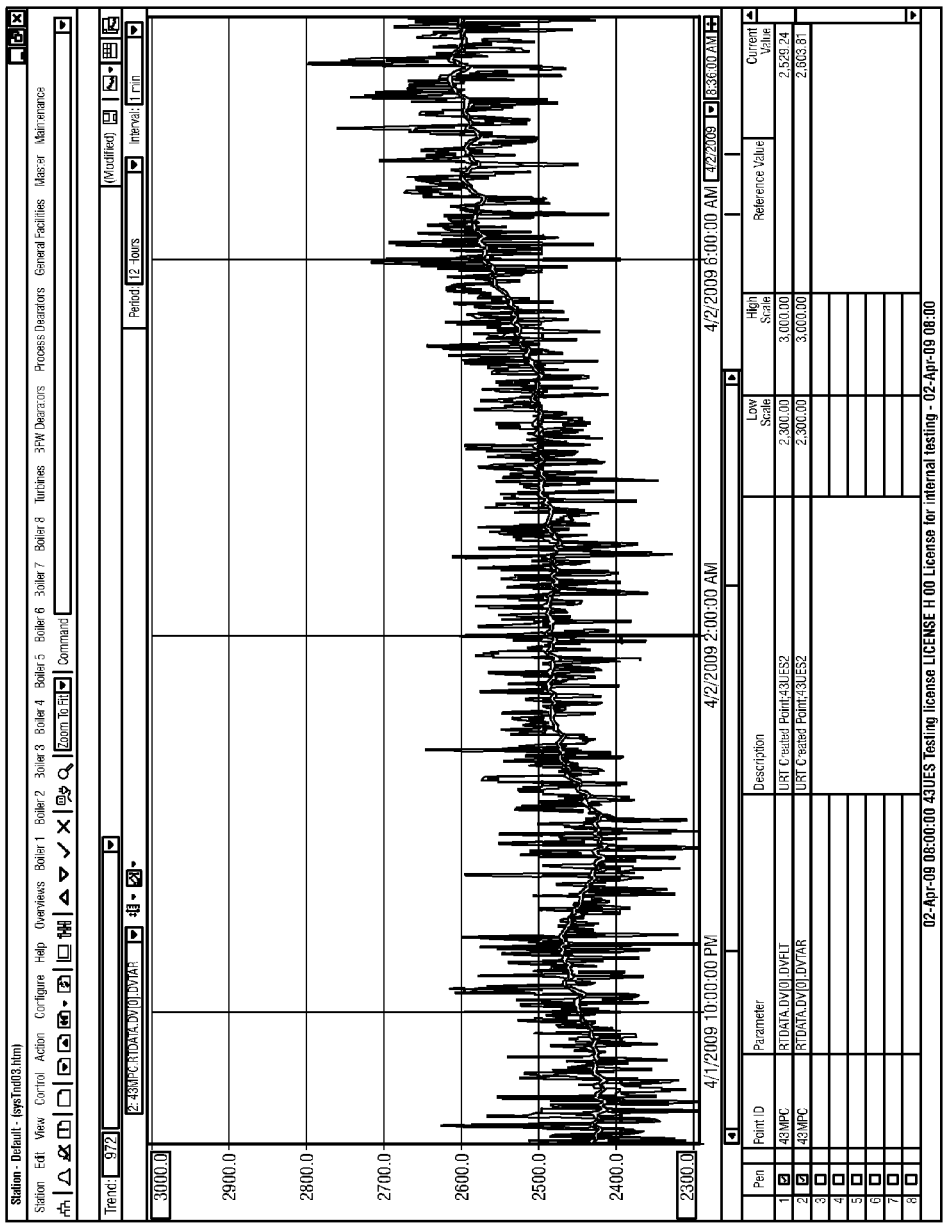
FIG. 3 illustrates a trend of an estimated disturbance with separated current and steady state value of the disturbance, in accordance with an embodiment.

FIG. 3 illustrates a GUI 300 of a pulse disturbance model, in accordance with an embodiment. The GUI 300 represents a predicted trajectory, which may be a pulse signal model for disturbance signal from the disturbance model 120. As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components.

Figure 4:
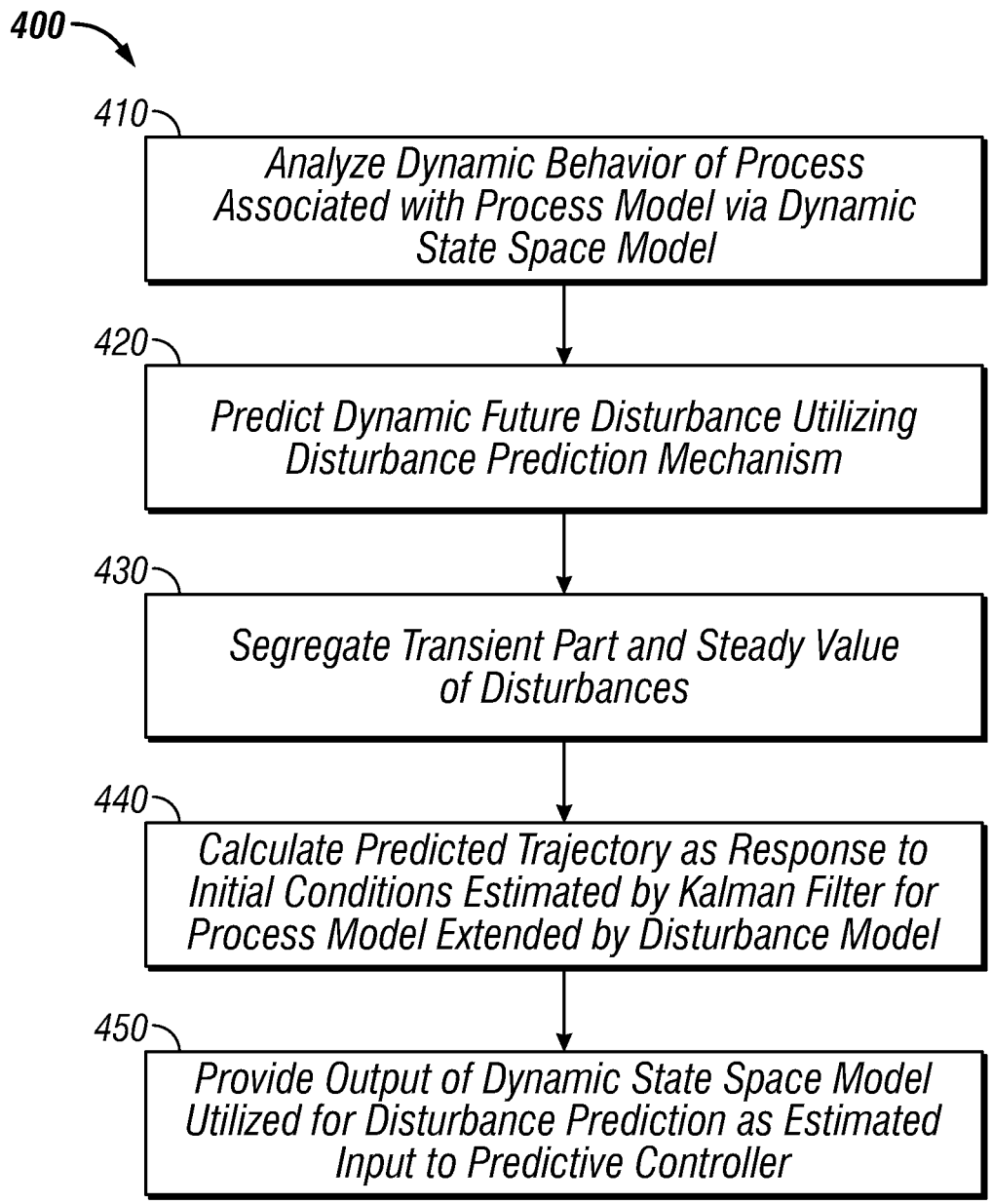
FIG. 4 illustrates flow chart of operations illustrating logical operational steps of a method for predicting future disturbance in MPC applications, in accordance with an embodiment.

FIG. 4 illustrates a flow chart of operations illustrating logical operational steps of a method 400 for predicting future disturbance in MPC applications, in accordance with an embodiment. The dynamic behavior of a physical process associated with the process model 110 can be analyzed via the dynamic state space model 120 in order to manipulate functions representing future disturbances, as depicted at block 410. The future disturbances can be predicted utilizing the disturbance prediction module associated with the dynamic state space model, as illustrated at block 420. The transient part and the steady state value of the disturbances can be segregated, as depicted at block 430. Further, the predicted trajectory can be calculated as a response to the initial conditions estimated by the Kalman filter 260 for the process model 110 extended by the disturbance model 120, as shown at block 440. The output of the dynamic state space model utilized for the disturbance prediction can be provided as estimated input to the MPC Controller 250, as illustrated at block 450.

The MPC Controller 250 utilizes the process model 110 and the disturbance model 120 to achieve the desired behavior of the process model 110 by determining process predictions and ultimately provides an optimized output to the process model 110 with a controlled set of parameters. The output from the MPC Controller 250 can be further utilized as a controlled input for the process model 110 to obtain an optimized output. The unforced response can be significantly calmer; therefore, the proposed approach can be effectively utilized in high frequencies and pulse disturbances. The MPC technique associated with the dynamic future disturbance prediction module can gain a widespread acceptance in the process model due to its ability to achieve multi-variable control objectives in the presence of dead time, process constraints, and modeling uncertainties.

Figure 5:
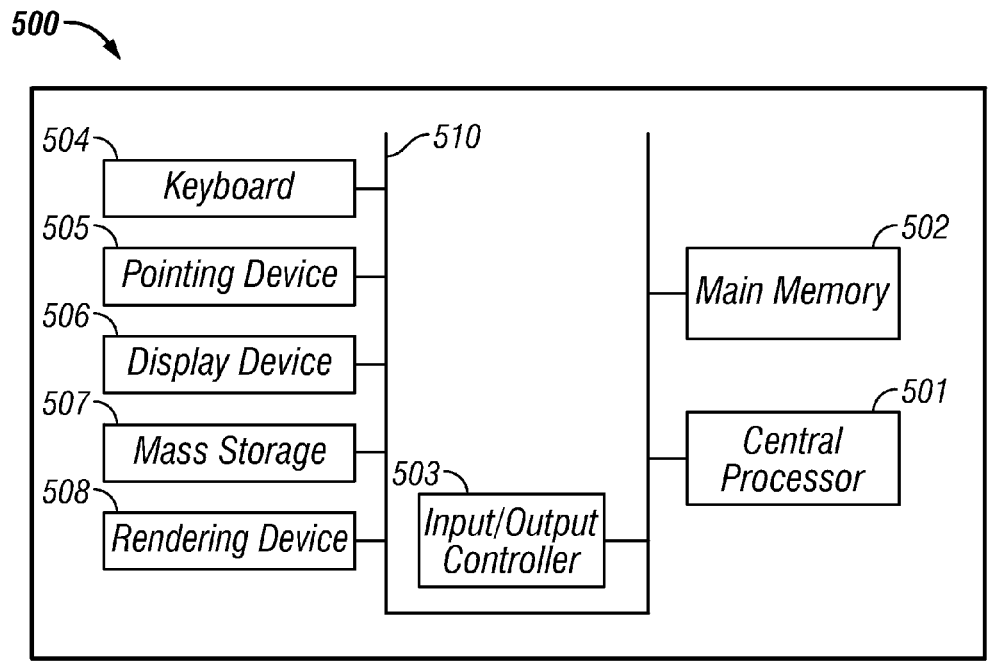
FIG. 5 illustrates a data-processing apparatus, which may be utilized to carry out an embodiment.
Figure 6:
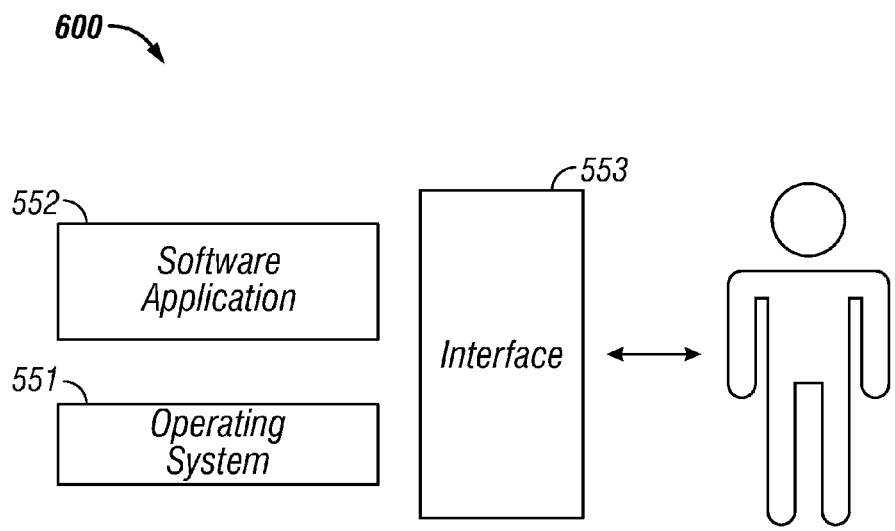
FIG. 6 illustrates a schematic view of a system that includes an operating system, application software, and a user interface that may be utilized for carrying out an embodiment.

FIGS. 5-6 are provided as exemplary diagrams of data processing environments in which embodiments of the present invention may be implemented. It should be appreciated that FIGS. 5-6 are only exemplary and are not intended to assert or imply any limitation with regard to the environments in which aspects or embodiments of the present invention may be implemented. Many modifications to the depicted environments may be made without departing from the spirit and scope of the present invention. FIGS. 5-6 are provided to demonstrate that the methodology described herein can be implemented in the context of software and various software applications, including software modules and the like. Note that the various features and aspects shown herein may be provided as such modules. For example, the process model 110, the disturbance model 120, and the process predictions component 130 disclosed in FIG. 1 may be, for example, software modules. Similarly, the Kalman Filter 260, process dynamics 251, the MPC controller 250, and so forth may also be implemented in the context of software modules. Systems 201 and 203, for example, may also be implemented in the context of software modules and/or software applications (e.g., software application 552 shown in FIG. 5).

FIG. 5 illustrates an example of a data-processing apparatus 500, which may assist in carrying out an embodiment. The data-processing apparatus 500 generally includes a central processor 501, a main memory 502, an input/output controller 503, an input device such as, for example, a keyboard 504, a pointing device 505 (e.g., mouse, track ball, pen device, or the like), a display device 506, and a mass storage 507 (e.g., hard disk). Additional input/output devices, such as a rendering device 508, may be utilized in association with the data-processing apparatus 500 as desired. As illustrated, the various components of the data-processing apparatus 500 communicates through a system bus 510 or similar architecture.

FIG. 6 illustrates an example of a software system 600 that can be utilized for directing the operation of the data-processing apparatus 500. Software system 550, which is stored in system memory 502 and on disk memory 507, includes a kernel or operating system 551 and a shell or interface 553. One or more application programs, such as application software 552, may be "loaded" (i.e., transferred from storage 507 into memory 502) for execution via the data-processing apparatus 500. The data-processing apparatus 500 receives user commands and data through user interface 553; these inputs may then be acted upon by the data-processing apparatus 500 in accordance with instructions from operating module 551 and/or application module 552.

The interface 553, which is preferably a graphical user interface (GUI), also serves to display results, whereupon the user may supply additional inputs or terminate the session. In one particular embodiment, operating system 551 and interface 553 can be implemented in the context of a "Windows" system. Thus, interface 553 may be, for example, a GUI such as GUI 300 described earlier. In another embodiment, operating system 551 and interface 553 may be implemented in the context of other operating systems such as Linux, UNIX, etc. Application module 552, on the other hand, can include instructions such as the various operations described herein with respect to the various components and modules described herein. Such instructions may process, for example, the method 400 described herein with respect to FIG. 4.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for predicting disturbances of a physical process, said method comprising:
    analyzing the dynamic behavior of a physical process of a mineral refinery associated with a process model via a dynamic state space model thereby manipulating functions representing future disturbances;
    predicting said future disturbances utilizing a disturbance prediction module associated with said dynamic state space model;
    segregating a transient part and segregating a steady state value of said-disturbances associated with said process model, indicative of said dynamic behavior of said physical process associated with said mineral refinery being controlled thereto;
    calculating a predicted trajectory as a response to an initial condition estimated by a Kalman Filter based on outputs of said process model and said disturbance model;
    estimating a future deviation using said disturbance prediction module; generating an estimated disturbance prediction output of said disturbance model based on the predicted trajectory;
    inputting said estimated disturbance prediction output into a separate external model-based predictive controller wherein said model based predictive is implemented as an online optimization and uses equivalent lookup tables computed according to a hybrid multi-parametric algorithm;
    providing manipulated variables from said model-based predictive controller to a process dynamics module; wherein said manipulated variables are determined based on said estimated disturbance prediction output; wherein said output of said process dynamic module is determined based on an actual disturbance variable and said manipulated variable; wherein said output of said process model is determined based on said estimated disturbance prediction output and said manipulated variables;
    determining process predictions by said model-based predictive controller based on said disturbance prediction output and thereafter providing an optimized output as a controlled input to said process model; and
    controlling said physical process based on said optimized output as a controlled input.

2. The method of claim 1 further comprising:
    inputting disturbance variables from said disturbance model into said process model wherein said disturbance model comprises a dynamic response of observed disturbances transformed to a dynamic state space model.

3. The method of claim 2 further comprising:
    estimating said future deviation as a function of a past deviation and a current deviation from said process model by said disturbance prediction module; and
    inputting said disturbance variables into said model predictive controller.

4. The method of claim 3 wherein said disturbance model provides data indicative of said current deviation from said process model and said future deviation over a predetermined prediction horizon.

5. The method of claim 4 further comprising transmitting an input signal indicative of a measured process parameter to said model-based predictive controller.

6. The method of claim 5 wherein said disturbance prediction module performs an independent process control decision to determine manipulated parameter values in response to said input signal.

7. The method of claim 6 further comprising transmitting a command signal from said model-based predictive controller to said process model external to said model-based predictive controller which include said manipulated parameter value to govern said process model.

8. A system for predicting disturbances, said system comprising:
    a processor;
    a data bus coupled to said processor; and
    a computer-usable medium embodying computer code, said computer-usable medium being coupled to said data bus, said computer program code comprising instructions executable by said processor and configured for:
    analyzing the dynamic behavior of a physical process of a mineral refinery associated with a process model via a dynamic state space model thereby manipulating functions representing future disturbances;
    predicting said future disturbances utilizing a disturbance prediction module associated with said dynamic state space model;
    segregating a transient part and segregating a steady state value of said disturbances associated with said process model, indicative of said dynamic behavior of said physical process associated with said mineral refinery being controlled thereto;
    calculating a predicted trajectory as a response to an initial condition estimated by a Kalman Filter based on outputs of said process model and said disturbance model;
    estimating a future deviation using sad disturbance prediction module;
    generating an estimated disturbance prediction output of said disturbance model based on the predicted trajectory;
    inputting said estimated disturbance prediction output into a separate external model predictive controller wherein said model based predictive controller implemented as an online optimization and using equivalent lookup tables computed according to a hybrid multi-parametric algorithm;
    providing manipulated variables from said model-based predictive controller to a process dynamics module; wherein said manipulated variables are determined based on said estimated disturbance prediction output; wherein said output of said process dynamic module is determined based on an actual disturbance variable and said manipulated variable; wherein said output of said process model is determined based on said estimated disturbance prediction output and said manipulated variables;
    determining process predictions by said model-based predictive controller based on said disturbance prediction output and thereafter providing an optimized output as a controlled input to said process model, and controlling said physical process based on said optimized output as a controlled input.

9. The system of claim 8 further comprising:
inputting disturbance variables from said disturbance model into said process model wherein said disturbance model comprises a dynamic response of observed disturbances transformed to a dynamic state space model.

10. The system of claim 9 wherein said instructions are further configured for:
estimating said future deviation as a function of a past deviation and a current deviation from said process model by said disturbance prediction module; and
inputting said disturbance variables into said model predictive controller.

11. The system of claim 10 wherein said instructions are further configured for generating from said disturbance model, data indicative of said current deviation from said process model and said future deviation over a predetermined prediction horizon.

12. The system of claim 11 wherein said instructions are further configured for transmitting an input signal indicative of a measured process parameter to said model predictive controller.

13. The system of claim 12 wherein said instructions are further configured for performing via said disturbance prediction module, an independent process control decision to determine manipulated parameter values in response to said input signal.

14. The system of claim 13 wherein said instructions are further configured for transmitting a command signal from said model predictive controller to said process model external to said model-based predictive controller which includes said manipulated parameter value to govern said process model.

15. A non-transitory computer-readable medium for authorizing access to a secure location, said computer-readable medium embodying a computer program code, said computer program code comprising computer executable instructions configured for;
analyzing the dynamic behavior of a physical process of a mineral refinery associated with a process model via a dynamic state space model thereby manipulating functions representing future disturbances;
predicting said future disturbances utilizing a disturbance prediction module associated with said dynamic state space model;
segregating a transient part and segregating a steady state value of said-disturbances associated with said process model, indicative of said dynamic behavior of said physical process associated with said mineral refinery being controlled thereto;
calculating a predicted trajectory as a response to an initial condition estimated by a Kalman Filter based on outputs of said process model and said disturbance model;
estimating a future deviation using said disturbance prediction module; generating an estimated disturbance prediction output of said disturbance model based on the predicted trajectory;
inputting said estimated disturbance prediction output into a separate external model predictive controller wherein said model predictive controller is implemented as an online optimization and uses equivalent lookup tables computed according to a hybrid multi-parametric algorithm;
providing manipulated variables from said model-based predictive controller to a process dynamics module; wherein said manipulated variables are determined based on said estimated disturbance prediction output; wherein said output of said process dynamic module is determined based on an actual disturbance variable and said manipulated variable; wherein said output of said process model is determined based on said estimated disturbance prediction output and said manipulated variables;
determining process predictions by said model-based predictive controller based on said disturbance prediction output and thereafter providing an optimized output as a controlled input to said process model; and
controlling said physical process based on said optimized output as a controlled input.

16. The non-transitory computer-readable medium of claim 15 further comprising:
inputting disturbance, variables from said disturbance model into said process mode wherein said disturbance model: comprises a dynamic response of observed disturbances transformed to a dynamic state space model.

17. The computer-usable medium of claim 16 wherein said embodied computer program code further comprises computer executable instructions configured for estimating said future deviation as a function of a past deviation and a current deviation from said process model by said disturbance prediction module; and
inputting said disturbance variables into said model predictive controller.

18. The non-transitory computer-readable medium of claim 17 wherein said embodied computer program code further comprises computer executable instructions configured for generating via said disturbance model, data indicative of said current deviation from said process model and said future deviation over a predetermined prediction horizon.

19. The non-transitory computer-readable medium of claim 18 wherein said embodied computer program code further comprises computer executable instructions configured for performing via said disturbance prediction module, an independent process control decision to determine manipulated parameter values in response to said input signal.

20. The non-transitory computer-readable medium of claim 19 wherein said embodied computer program code further comprises computer executable instructions configured for:
transmitting an input signal indicative of a measured process parameter to said model predictive controller; and
transmitting a command signal from said model predictive controller to said process model external to said model-based predictive controller which includes said manipulated parameter value to govern said process model.

* * * * *